Sept. 13, 1960   C. C. FUERST   2,952,198
IMPACT SHUTTER
Filed Jan. 19, 1959   2 Sheets-Sheet 1

CARL C. FUERST
INVENTOR.

BY R. Frank Smith

ATTORNEYS

Sept. 13, 1960 C. C. FUERST 2,952,198
IMPACT SHUTTER

Filed Jan. 19, 1959 2 Sheets-Sheet 2

CARL C. FUERST
INVENTOR.

BY
ATTORNEYS

United States Patent Office 2,952,198
Patented Sept. 13, 1960

2,952,198
IMPACT SHUTTER

Carl C. Fuerst, Rochester, N.Y., assignor to Eastman Kodak Company, Rochester, N.Y., a corporation of New Jersey Filed Jan. 19, 1959, Ser. No. 787,483

3 Claims. (Cl. 95—62)

This invention relates to photography and more particularly to an inexpensive shutter for photographic cameras.

This application is a continuation-in-part of application Serial No. 590,160, filed June 8, 1956.

It has always been difficult in the past to provide a simple and inexpensive camera shutter in which the duration of the exposures can be accurately repeated in such a manner that even extremely sensitive film such as some of the color films now on the market can be accurately exposed. My present invention is particularly directed to such a shutter mechanism.

One object of my invention is to provide a shutter consisting of comparatively few parts which can be readily manufactured and assembled. Another object of my invention is to provide a shutter mechanism in which the exposure will be quite efficient in that the opening and closing time of the shutter blades is reduced to a minimum, and in which the full open time of the blades is relatively long compared to the opening and closing time of the blades. Another object of my invention is to provide a mechanism which may be readily assembled by relatively unskilled help. Other objects will appear from the following specification, the novel features being particularly pointed out in the claims at the end thereof.

Coming now to the drawings wherein like reference characters denote like parts throughout:

My invention consists in providing a simple type of camera shutter in which uniform exposures may be made by causing an impact member to strike a flywheel so that it may in turn transmit motion to a lever connected to the shutter blades to open and close the blades to make an exposure. In the present instance I prefer to have this exposure approximately 1/40 of a second but this can be readily controlled by the arrangement of the shutter parts, and is given by way of example only.

Figure 1:
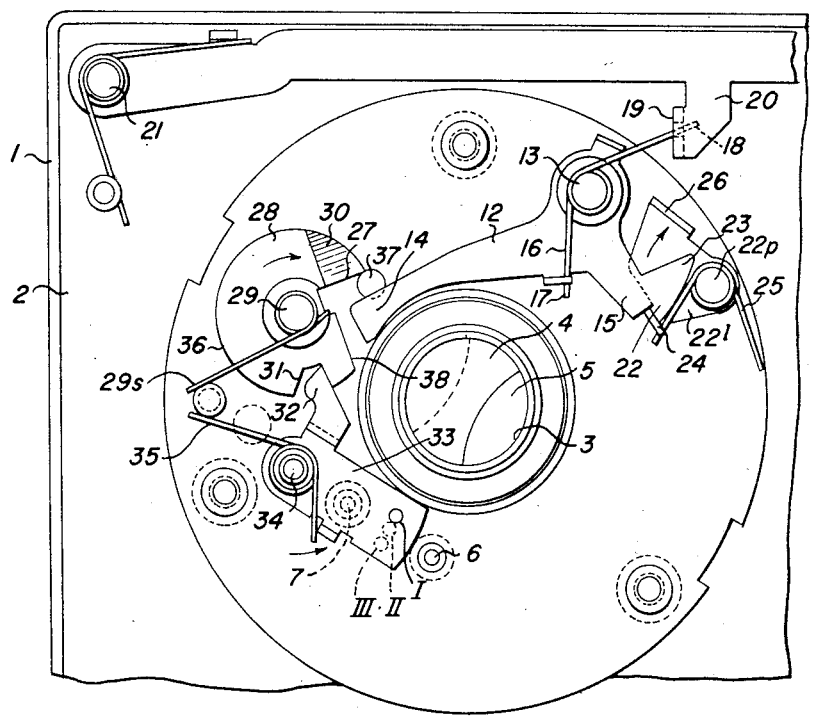
Fig. 1 is a fragmentary front plan view of a shutter constructed in accordance with and embodying a preferred form of my invention. The shutter parts are shown in a rest position with shutter blades covering the exposure aperture.
Figure 2:
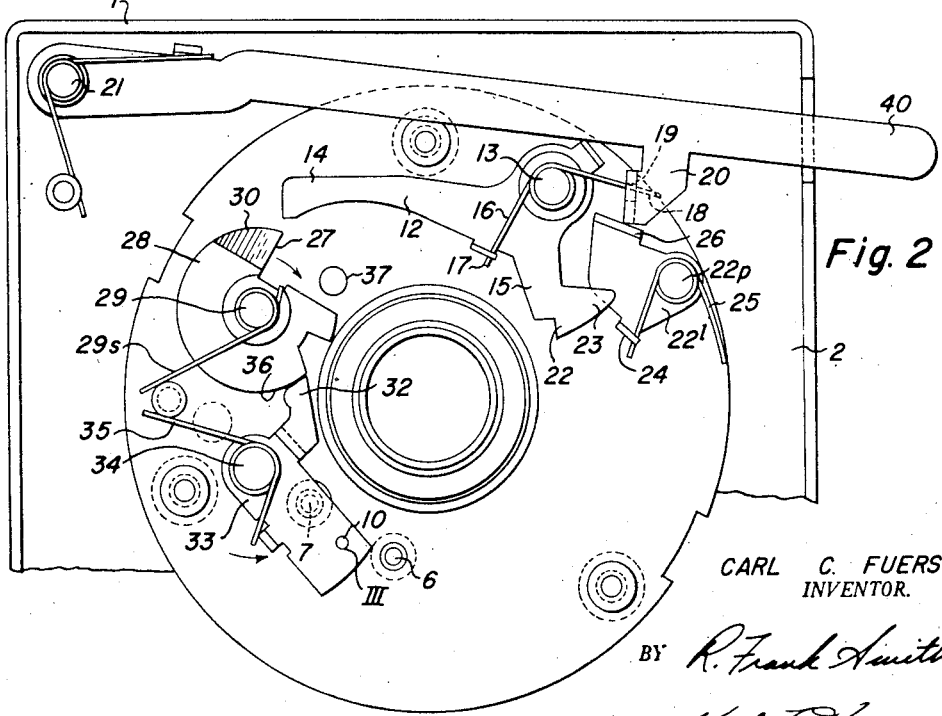
Fig. 2 is a view similar to Fig. 1 but with the shutter parts shown in the position they assume just after an exposure has been made, the blades having been open and being about ready to close through slight further movement of the shutter parts.

Referring to Figs. 1 and 2, the shutter may consist of a shutter housing 1 which is only partially shown, this shutter housing including an apertured support or mechanism plate 2 which may form part of the housing or may be attached thereto. The plate 2 has a central aperture 3 through which the exposure is made when shutter leaves 4 and 5 are moved as will be hereinafter described.

Figure 3:
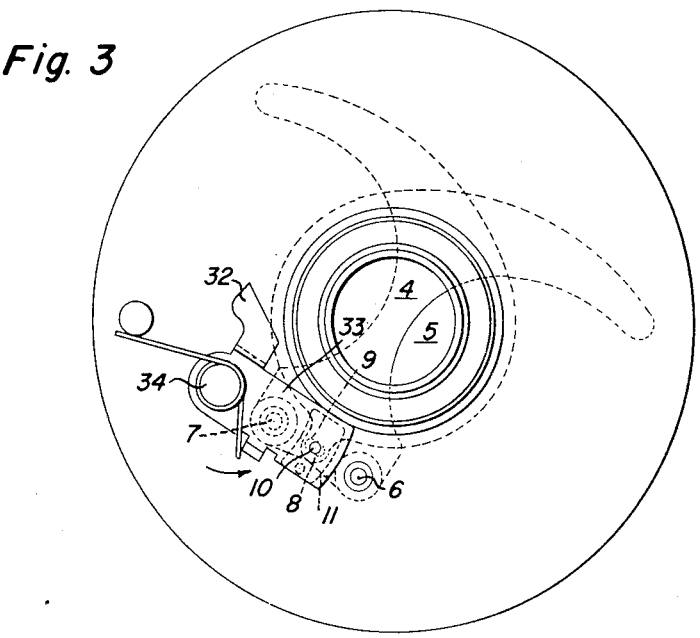
Fig. 3 is a fragmentary view showing the operating lever and parts of the shutter blades and their relationship to the operating lever.

The shutter leaves 4 and 5 are of a known type shown in Fig. 3 in which each blade is roughly "sickle" shaped, the blades being mounted upon spaced pivots 6 and 7. The shutter blades may each be provided with transverse slots 8 and 9, these slots providing a means for a pin 10 which passes through the slots to operate the shutter leaves from their rest position, shown in Fig. 1, to their fully open position, shown in Fig. 2, and back to their original rest position. The pin 10 may pass through slot 11 in the mechanism plate which provides suitable clearance. While the preferred embodiment includes the two shutter blades shown, obviously only a single blade or more than two blades may be used if desired.

The shutter is provided with an impact member 12 pivoted on a stud 13 carried by the mechanism plate. This impact member is provided with an arm 14 which is the striking arm and an arm 15 which is a latching arm. A spring 16 having one end lying behind the lug 17 and having the other end 18 engaging an aperture 19 in the trigger 20 is for driving the impact arm. A trigger 20 may be pivoted at 21 and may turn on this pivot to move the spring end 18 toward spring end 17, thus winding up the spring 16 which may drive the impact member 12 when this member is released.

As indicated in Fig. 1, the arm 15 is provided with a latch element 22 which is provided with an outwardly extending end 23 to guide the latch element into place after an exposure. The latch element 22 may be engaged by a latch element 24 in the form of an upwardly extending lug from the latch member 22$^1$. This latch member is normally turned in a clockwise direction by means of a spring 25. The latch 22$^1$ may turn on a suitable pivot 22p. Thus the elements 22 and 24 are normally in engagement and when the lug 20 on the trigger moves into contact with a flange 26 on the latch element, the latch is swung counterclockwise until the lug 24 rides off the latch element 22 at which time the impact member will move rapidly in a clockwise direction so that the end 14 will strike a flange 27 on the flywheel 28. This arm end 14 is preferably flexible and may ride over a ramp 30 as will be later described.

Figure 4:
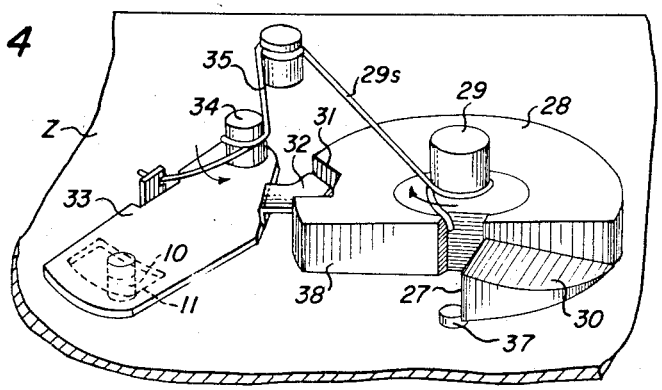
Fig. 4 is a perspective view of the shutter blade opening mechanism, the parts being shown in their rest position.
Figure 5:
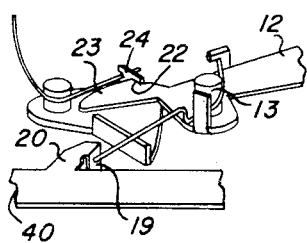
Fig. 5 is a fragmentary detail showing the shutter latch mechanism.

This flywheel is preferably in the form of a weighted member, best shown in Fig. 4. The flywheel is pivoted upon a stud 29 and it includes a ramp 30 up which the end 14 of the impact member 12 may move after an exposure so that it may come to rest again in its Fig. 1 position. A spring 29s tends to turn the flywheel clockwise. The flywheel is also provided with a notch 31 in which an end 32 of the blade-operating lever 33 may lie when in a rest position. The blade-operating lever 33 carries a downwardly extending pin 10, this pin entering the slots 8 and 9 in the blades 4 and 5 as described above. In Fig. 1, I represents the blade-engaging pin in a shutter blade closed or rest position: at II the blades would be partially open and at III the blades would be fully open. The lever 33 is pivoted at 34 to the mechanism plate 2 and the spring 35 tends to turn the lever 33 so that the arm 32 will contact with the flywheel. This contact may be in the slot 31, as shown in Fig. 1, which is the rest position, or it may be on the smooth periphery 36, as shown in Fig. 2, in which position the blades are fully open.

The flywheel 28 is normally turned by a spring 29s in a clockwise direction until the shoulder 27 rests against a stop pin 37, as shown in Fig. 1. When the impact lever strikes the shoulder 27 and swings the flywheel in a counterclockwise direction, the arm 32 of the blade-operating lever 33 moves from the notch 31 as the blades are opened, to the periphery 36 of the flywheel which is smooth so that little retarding action is caused by the blade-operating lever while the flywheel may move back and forth with the shutter blades in a fully open position, as shown in Fig. 2. When the spring 29s is sufficiently tensioned by the counterclockwise movement of the flywheel 28 and after the impact member 12 has swung beyond the flywheel, as shown in Fig. 2, the motion of the flywheel is reversed and its spring 29s and the flywheel will be driven backwardly or in a clockwise direction until the shoulder 27 strikes the stop pin 37. Thus the oscillation of the flywheel causes the exposures to be made in an accurately timed relation each time the trigger is depressed. Since the impact member 12 always strikes the flywheel 28 with the same force, it will travel the same distance each time and the exposures will remain of the same duration.

In the present instance the flywheel 28 moves through an angle of somewhat less than 90 degrees or the distance between the shoulder 27 and stop pin 37 and the flat wall 38 of the flywheel and the stop pin. In the present instance the stop pin 37 is a limiting factor. However, it is a comparatively simple matter to increase the stroke or oscillation distance of the flywheel 28 if this should be desirable for obtaining a somewhat longer exposure by cutting the shoulder or flat surface 38 so that it will lie adjacent to the notch 31 or by other suitable methods. By the same token it would be a simple matter to decrease the exposure time by limiting the stroke or oscillation distance of the flywheel. This could readily be done by pivotally mounting a stop member on the shutter casing in such a way that it could be selectively pivoted into the path of a stop surface, on the flywheel, e.g. flat 38, to limit the flywheel travel to a distance less than that which the engagement of stop pin 37 and flat 38 would normally allow. A two-speed shutter could be readily provided in this manner. It has been found, however, that the construction shown is satisfactory for producing the required exposures and it is also obvious that the exposures may be altered by altering the strength of the drive spring for the impact member so that the blow struck on the shoulder 27 may be of greater or lesser force and, consequently, the speed of the flywheel may readily be varied in manufacture to obtain the desired speed. In the present instance the shutter is for making a single exposure only and, as pointed out above, this exposure may be 1/40 of a second if desired.

From the above description it will be seen that a simple, inexpensive and accurately timed shutter may readily be made in which the trigger handle 40 may be depressed to wind up the driving spring for the impact member 12, and after winding the spring while the impact lever is held against movement, may then unlatch the lever to strike the shoulder 27. As this occurs, the flywheel 28 may move in a counterclockwise direction and after the impact, the impact lever 12 will move to its Fig. 2 position in which the flywheel is free to continue turning in a counterclockwise direction until its spring 35 is sufficiently wound to reverse the direction of the flywheel. During the time the operating lever end 32 is in contact with the periphery 36 of the flywheel, the blades do not move but remain in an open position. Thus, the flywheel's movement in a counterclockwise and clockwise direction will merely cause the end 32 to ride on the periphery 36 but as soon as the end 32 drops into the notch 31, the blades will immediately close. The time of opening and closing is quite rapid because of the notch and end arrangement which causes this movement through a comparatively few degrees of movement of the flywheel.

While I have shown my invention incorporated in a shutter of the automatic type, or one where the trigger 20 both tensions the shutter-driving spring 16 and then trips the shutter by operaing latch element 22, it will be readily appreciated that the invention could be applied to setting type shutters wherein the shutter-driving spring 16 would be tensioned by a setting lever separate from the trigger and the trigger would only act to release latch element 22 to trip the shutter after it was cocked.

It is obvious that various changes of portions and springs may readily be made so that an exposure of the required duration may readily be obtained. I consider as within the scope of my invention all such changes as may come within the scope of the appended claims.

Having thus described my invention, what I claim as new and desire to secure by Letters Patent of the United States is:

1. A shutter for cameras comprising an apertured support, a shutter blade pivoted thereon for movement from and to the aperture, a driving mechanism for the shutter blade including a pivoted lever connected to the blade for moving the latter between its two positions as the lever oscillates about its pivot, a flywheel oscillatably carried by the support and having a smooth periphery with a notch therein, a spring for pressing the pivoted lever into engagement with the periphery of the flywheel to contact the smooth periphery or the notch thereof according to the position of the flywheel whereby said lever may have a lost motion connection with the flywheel as the flywheel moves in two directions when the lever is engaging said smooth periphery, an abutment on the flywheel, a stop on the apertured support against which the flywheel may normally rest and in which position said lever engages said notch, a spring tending to turn the flywheel against the stop, an impact lever pivotally carried by the support, an impact spring engaging said impact lever and when tensioned tending to turn the impact lever to strike the flywheel abutment and then move out of the path of said abutment as the flywheel is turned by the impact lever, a spring latch normally engaging the impact lever and holding it against movement, a trigger, an arm on the trigger holding one end of the impact spring tending to turn the impact lever, whereby movement of the trigger in a releasing direction may tension said impact spring, the trigger including means for releasing the impact lever latch after tensioning the impact spring to a predetermined degree whereby said lever may strike the flywheel abutment driving the flywheel in a direction to wind up the flywheel spring whereby the pivoted lever may be moved to move the shutter blade from the aperture in the support, the direction of movement of the flywheel being reversed when the impact lever moves out of the path of the abutment on the flywheel and the tensioned flywheel spring drives the flywheel to a rest position thereby moving the shutter blade over the aperture in the support to complete the exposure.

2. A shutter construction for cameras as defined in claim 1 characterized in that there is a ramp on the flywheel in the path of the impact lever when the flywheel is in a rest position whereby the impact lever may ride up over the ramp in moving through its path of movement in one direction.

3. A shutter for cameras comprising an apertured support, a shutter blade pivoted thereon for movement from and to the aperture, a driving mechanism for the shutter blade including a pivoted lever connected to the blade for moving the latter between its two positions as the lever oscillates about its pivot, a flywheel oscillatably carried by the support and having a smooth periphery with a notch therein, a spring for pressing the pivoted lever into engagement with the periphery of the flywheel to contact the smooth periphery or the notch thereof according to the position of the flywheel whereby said lever may have a lost motion connection with the flywheel as the flywheel moves in two directions when the lever is engaging said smooth periphery, an abutment on the flywheel, a stop on the apertured support against which the flywheel may normally rest and in which position said lever engages said notch, a spring tending to turn the flywheel against the stop, an impact lever pivotally carried by the support, an impact spring engaging said impact lever and when tensioned tending to turn the impact lever to strike the flywheel abutment and then move out of the path of said abutment as the flywheel is turned by the impact lever, means for tensioning said impact spring, a spring latch normally engaging the impact lever and holding it against movement under the action of said impact spring, a trigger for releasing said spring latch after the impact spring is tensioned, whereby said lever may strike the flywheel abutment driving the flywheel in a direction to wind up the flywheel spring whereby the pivoted lever may be moved to move the shutter blade from the aperture in the support, the direction of movement of the flywheel being reversed when the impact lever moves out of the path of the abutment on the flywheel and the tensioned flywheel spring drives the flywheel to a rest position thereby moving the shutter blade over the aperture in the support to complete the exposure.

References Cited in the file of this patent

UNITED STATES PATENTS

| | | |
|---|---|---|
| 2,525,549 | Hodges | Oct. 10, 1950 |
| 2,638,825 | Fairbank | May 19, 1953 |